United States Patent
Slife et al.

(10) Patent No.: US 6,889,424 B2
(45) Date of Patent: May 10, 2005

(54) HEAD STACK ASSEMBLY INSTALLATION SYSTEM FOR A DISC DRIVE

(75) Inventors: Russell P. Slife, Oklahoma City, OK (US); James R. Jenkins, Yukon, OK (US); Roger A. Jessen, Norman, OK (US); Ronald D. Fowler, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 233 days.

(21) Appl. No.: 10/172,692

(22) Filed: Jun. 14, 2002

(65) Prior Publication Data

US 2002/0148104 A1 Oct. 17, 2002

Related U.S. Application Data

(62) Division of application No. 09/641,695, filed on Aug. 18, 2000.
(60) Provisional application No. 60/150,138, filed on Aug. 20, 1999.

(51) Int. Cl.$^7$ ........................... G11B 5/127; H04R 31/00
(52) U.S. Cl. ........................ 29/603.03; 29/428; 29/525; 29/603.09; 29/787; 29/737; 29/739; 29/840; 360/266.1; 73/9
(58) Field of Search ............... 29/428, 525, 603.03, 29/603.09, 737, 739, 787, 840; 360/266.1; 73/9

(56) References Cited

U.S. PATENT DOCUMENTS

| | | |
|---|---|---|
| 4,630,344 A | 12/1986 | Boyle et al. |
| 4,723,353 A | 2/1988 | Monforte |
| 4,729,713 A | 3/1988 | Takaichi et al. |
| 4,781,519 A | 11/1988 | Monforte |
| 4,790,709 A | 12/1988 | Sakimori et al. |
| 4,862,584 A * | 9/1989 | Budy et al. .................... 29/704 |
| 5,038,466 A | 8/1991 | Marozsan et al. |
| 5,323,530 A | 6/1994 | Goto et al. |
| 5,404,636 A | 4/1995 | Stefansky et al. |
| 5,539,981 A | 7/1996 | Burcham et al. |
| 5,777,267 A | 7/1998 | Szydel |
| 5,798,919 A | 8/1998 | Suita et al. |
| 5,877,571 A | 3/1999 | Brooks |
| 5,918,196 A | 6/1999 | Jacobson |
| 5,943,761 A | 8/1999 | Tucker et al. |
| 6,049,969 A * | 4/2000 | Jenkins et al. .................. 29/737 |
| 6,052,653 A * | 4/2000 | Mazur et al. .................. 702/57 |
| 6,052,890 A | 4/2000 | Malagrino, Jr. et al. |
| 6,053,029 A * | 4/2000 | Nakajima et al. ................. 73/9 |
| 6,169,963 B1 | 1/2001 | Markov |
| 6,225,799 B1 | 5/2001 | Gergel et al. |
| 6,263,292 B1 | 7/2001 | Fiekowsky |

FOREIGN PATENT DOCUMENTS

JP   08180631 A * 7/1996 ........... G11B/23/03

OTHER PUBLICATIONS

"ESD damage of GMR sensors at head stack assembly"; Zeng, R.; Yu Qun; Fenggang Zhao; Hong Tian; Electrical Overstress/Electrostatic Discharge Symposium Proceedings, 1999, Sep. 28–30, 1999; pp.:380–384.*

* cited by examiner

*Primary Examiner*—A. Dexter Tugbang
*Assistant Examiner*—Paul Kim
(74) *Attorney, Agent, or Firm*—Jennifer M. Buenzow; Randy McCarthy

(57) ABSTRACT

A head stack assembly installation system with a frame supporting a head stack installation tool including a robotic assembly supporting a measurement assembly communicating with a computer hosting an installation software program. The robotic assembly picks and places the head stack assembly into the head disc assembly and the measurement assembly collects and communicates process positions and force parameters to the computer, the computer calculating distance and force data. The installation software program directs and controls enactment of process steps followed by the head stack installation tool to install or abort installation of the head stack assembly based on the position and force data.

7 Claims, 10 Drawing Sheets

HEAD STACK ASSEMBLY INSTALLATION SYSTEM FOR A DISC DRIVE

RELATED APPLICATIONS

This application is a divisional of U.S. patent application Ser. No. 09/641,695 filed Aug. 18, 2000, now abandoned which claims priority to U.S. Provisional Application No. 60/150,138 filed Aug. 20, 1999.

FIELD OF THE INVENTION

The present invention relates generally to the field of disc drive data storage devices, and more particularly, but not by way of limitation, to an automated assembly of a head-disc assembly of a disc drive, which includes a head stack assembly installation system.

BACKGROUND

Modern hard disc drives are commonly used in a multitude of computer environments, ranging from super computers through notebook computers, to store large amounts of data in a form that can be made readily available to a user. Typically, a disc drive comprises one or more magnetic discs that are rotated by a spindle motor at a constant high speed. The surface of each disc is a data recording surface divided into a series of generally concentric recording tracks radially spaced across a band having an inner diameter and an outer diameter. The data tracks extend around the disc and store data within the tracks on the disc surfaces in the form of magnetic flux transitions. The flux transitions are induced by an array of transducers, otherwise commonly called read/write heads. Typically, each data track is divided into a number of data sectors that store fixed sized data blocks.

The read/write head includes an interactive element such as a magnetic transducer, which senses the magnetic transitions on a selected data track to read the data stored on the track. Alternatively, the read/write head transmits an electrical signal that induces magnetic transitions on the selected data track to write data to the track.

As is known in the art, each read/write head is mounted to a rotary actuator arm and is selectively positionable by the actuator arm over a selected data track of the disc to either read data from or write data to the selected data track. The read/write head includes a slider assembly having an air-bearing surface that causes the read/write head to fly above the disc surface. The air bearing is developed as a result of load forces applied to the read/write head by a load arm interacting with air currents that are produced by rotation of the disc.

Typically, a plurality of open-center discs and open-centered spacer rings are alternately stacked on the hub of a spindle motor, followed by the attachment of a clampring to form a disc pack or disc stack. The hub, defining the core of the stack, serves to align the discs and spacer rings around a common centerline. Movement of the discs and spacer rings is typically constrained by a compressive load maintained by the clampring. The read/write heads mounted on a complementary stack of actuator arms, which compose an actuator assembly, commonly called an E-block, accesses the surfaces of the stacked discs of the disc pack. The E-block also generally includes read/write head wires which conduct electrical signals from the read/write heads to a flex circuit which, in turn, conducts the electrical signals to a printed circuit board assembly (PCB). When the E-block is merged with the disc pack into a base deck and a cover is attached to the base deck a head-disc assembly (HDA) is formed. For a general discussion of E-block assembly techniques, see U.S. Pat. No. 5,404,636 entitled METHOD OF ASSEMBLING A DISC DRIVE ACTUATOR issued Apr. 11, 1995 to Stefansky et al., assigned to the assignee of the present invention.

The head-disc assembly (HDA) of a disc drive is typically assembled in a clean room environment. The need for maintaining a clean room environment (free of contaminants of about 0.3 micron and larger) is to ensure the head-disc interface remains unencumbered and damage free. The slightest damage to the surface of a disc or read/write head can result in a catastrophic failure of the disc drive. The primary causes of catastrophic failure, particularly read/write head crashes (a non-recoverable, catastrophic failure of the disc drive), are generally characterized as contamination, exposure to mechanically induced shock, and non-shock induced damage. The source of non-shock induced damage is typically traced to the assembly process, and generally stems from handling damage sustained by the disc drive during the assembly process.

Several factors that bear particularly on the problem of assembly process induced damage are the physical size of the disc drive, the spacing of the components, the recording densities sought to be achieved and the level of precision to be maintained during the assembly process. The high levels of precision required by the assembly process are necessary to attain the operational tolerances required by the disc drive. The rigorous operational tolerances are in response to market demands that have driven the need to decrease the physical size of disc drive while simultaneously increasing disc drive storage capacity and performance characteristics.

Demands on disc drive mechanical components and assembly procedures have become increasingly more critical in order to support capability and size in the face of these new market demands. Part-to-part variation in critical functional attributes in the magnitude of a micro-inch can result in disc drive failures. Additionally, as disc drive designs continue to decrease in size, smaller read/write heads, thinner substrates, longer and thinner actuator arms, and thinner gimbal assemblies will continue to be incorporated into the drives. This trend significantly increases the need to improve the assembly processes to protect the read/write heads and discs from damage resulting from incidental contact between mating components. The aforementioned factors resultantly increase the difficulty of assembling disc drives. As the assembly process becomes more difficult, the need to invent new tools, methods and control systems to deal with the emerging complexities presents unique problems in need of solutions.

Coupled with the size and performance improvement demands is the factor of further market driven-requirements for ever increasing fault tree performance. The progression of continually decreasing disc thickness and disc spacing, together with increasing track density and increasing numbers of discs in the disc pack, has resulted in a demand for tools, methods and control systems of ever increasing sophistication. A result of the growth in demand for sophisticated assembling equipment has been a decreasing number of assembly tasks involving direct operator intervention. Many of the tasks involved in modern assembly methods are beyond the capability of operators to reliably and repeatedly perform, further driving the need for automation equipment and tools.

In addition to the difficulties faced in assembling modern disc drives of high capacity and complex, physical product performance requirements have dictated the need to develop new process technologies to ensure compliance with operating specifications. The primary factors driving more stringent demands on the mechanical components and the assembly process are the continually increasing areal densities and data transfer rates of the disc drives.

The continuing trend in the disc drive industry is to develop products with ever increasing areal densities, decreasing access times and increasing rotational speeds. The combination of these factors, place greater demands on the ability of modern servo systems to control the position of read/write heads relative to data tracks. The ability to assemble HDAs nominally free from the effects caused by unequal load forces on the read/write heads, disc pack imbalance or one of the components of runout, velocity and acceleration (commonly referred to as RVA) posses a significant challenge as track densities increase. The components of RVA are: disc runout (a measure of the motion of the disc along the longitudinal axis of the motor as it rotates); velocity (a measure of variations in linear speed of the disc pack across the surface of the disc); and acceleration (a measure of the relative flatness of the discs in the disc pack).

One cause of unequal load forces on the read/write heads stems from misalignment of the head stack assembly during assembly of the HDA. Misalignment of the head stack assembly causes the fly-height of the individual read/write heads to deviate from optimum, causing an increase in the distance between the disc and the head for some surfaces and decreasing the distance for others. If the deviation is substantial; head/disc contact occurs that can lead to head crashes. For less severe deviations in fly heights, soft read errors often develop. If the soft errors are detected in the test process, the HDA is returned to the clean room for rework, exposing the HDA to handling damage. If the soft errors go undetected during the test process and develop during operation in the field, disc drive performance denigrates, write faults may be reported and reliability of the disc drive suffers. The ability to control the alignment of the head stack assembly derives from the ability to precisely control the installation of the head stack assembly into the HDA.

By design, a disc drive typically has a discreet threshold level of resistance to withstand rotationally induced noise and instability, below which the servo system is not impaired. Also, a fixed range of load forces must be maintained on the read/write head to ensure proper fly height for data exchange. The operating performance of the disc drive servo system is affected by mechanical factors beyond the effects of mechanically induced read/write head oscillation from disc surface anomalies. Errors are traceable to disc pack imbalance and RVA noise sources. Even with improved approaches to the generation of position error signals in the disc drive servo system, the ability of the system to deal with such issues is finite. The limits of the; servo system capability to reliably control the position of the read/write head relative to the data track must not be consumed by the noise present in the HDA resulting from the assembly process. Consumption of the available margin by the assembly process leaves no margin in the system to accommodate changes in the disc drive attributes over the life of the product. An inability to accommodate changes in the disc drive attributes leads to field failures and an overall loss in product reliability, a detrimental impact to product market position.

Thus, in general, there is a need for an improved approach to disc drive-assembling technology to minimize the potential of damage during assembly, to produce product that is design compliant and reliable, and to minimize mechanically induced system noise. More particularly, there is a need for a head stack assembly installation system controlling the installation of the head stack assembly into an HDA of a disc drive.

SUMMARY OF THE INVENTION

The present invention provides a head stack assembly installation system with a head stack installation tool electronically communicating with a computer that has an active installation software program directing and controlling process steps enacted by the head stack installation tool to install a head stack assembly into a head disc assembly of a disc drive. The head stack installation tool provides a nesting position for aligning and staging the head stack assembly prior to installation into the lead disc assembly, an installation position for locating and securing the head disc assembly while awaiting installation of the head stack assembly, a robotic assembly and a measurement assembly. The robotic assembly picks and places the head stack assembly into the head disc and the measurement assembly collects and communicates process position and force parameters to the computer for use by the computer in calculating distance and force data. The active installation software program directs and controls enactment of process steps followed by the head stack installation tool by directing the computer to execute installation software program steps based on the position and force data calculated by the computer.

These and other features and advantages which characterize the present invention will be apparent from a reading of the following detailed description and a review of the associated drawings.

DETAILED DESCRIPTION

Figure 1:
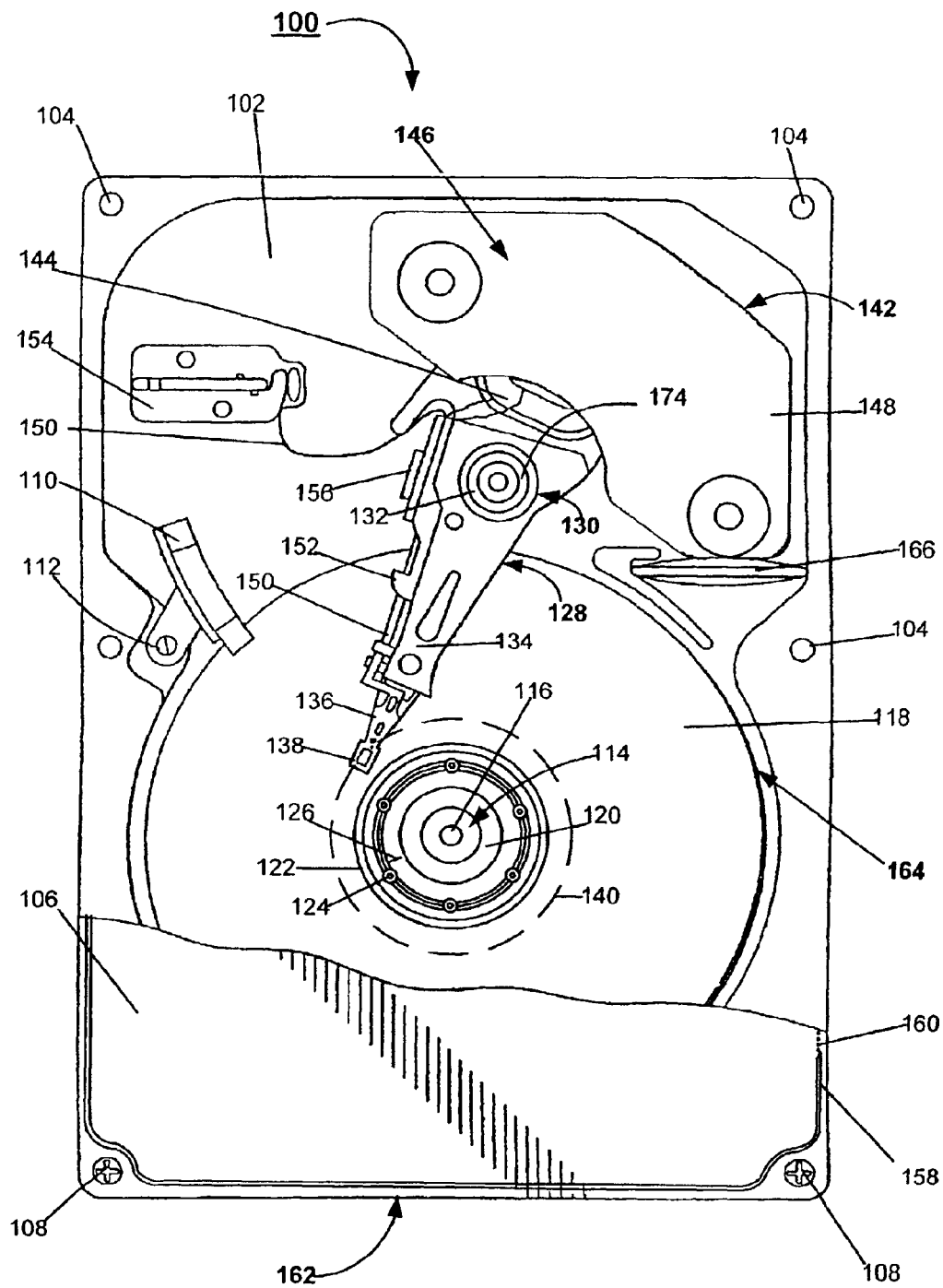
FIG. 1 is a partially cutaway top view of a disc drive of the type assembled by the head stack assembly installation system of the present invention.

Referring to the drawings in general, and more particularly to FIG. 1, shown therein is a top view of a disc drive 100 constructed in accordance with the present invention. The disc drive 100 includes a basedeck 102 that has several fastener receptacles 104, the basedeck 102 supporting various disc drive components, and a top cover 106 (shown in part), with several mounting apertures (not separately shown), secured to the basedeck 102 by top cover fasteners 108. The installed top cover 106 together with the basedeck 102 provides a sealed internal environment for the disc drive 100. Numerous details of and variations for the construction of the disc drive 100 are not included in the following description as such are well known to those skilled in the art and are believed to be unnecessary for the purpose of describing the present invention.

Mounted to the basedeck 102 is a ramp load snubber assembly 110 secured to the basedeck 102 by a fastener 112, and a spindle motor 114 with a top cover attachment aperture 116. The spindle motor 114 supports several discs 118 for rotation at a constant high speed, the discs 118 mounted on a spindle motor hub 120 that are secured by a clampring 122 with clampring fasteners 124. In addition to providing support for the stacked discs 118, the spindle motor hub 120 also provides a timing mark 126 used during the assembly process to reference the angular location of a source of rotational imbalance. Adjacent the discs 118 is an actuator assembly 128 (also referred to as an "E-block" or a head stack assembly (HSA)) which pivots about a bearing assembly 130 in a rotary fashion. The bearing assembly supports a beveled pick and place member 132 that serves as a tooling grip during assembly operations. The HSA 128 includes actuator arms 134 (only one shown) that support load arms 136. Each load arm 136 in turn supports read/write heads 138, with each of the read/write heads 138 corresponding to a surface of one of the discs 118. As mentioned, each of the discs 118 has a data recording surface divided into concentric circular data tracks 140 (only one shown), and the read/write heads 138 are positionably located over data tracks to read data from, or write data to, the tracks.

The HSA 128 is controllably positioned by a voice coil motor assembly (VCM) 142, comprising an actuator coil 144 immersed in the magnetic field generated by a magnet assembly 146. A magnetically permeable flux path is provided by a steel plate 148 (also called a top pole piece) mounted above the actuator coil 144 to complete the magnetic circuit of the VCM 142.

When controlled DC current is passed through the actuator coil 144, an electromagnetic field is setup, which interacts with the magnetic circuit of the VCM 142 to cause the actuator coil 144 to move relative to the magnet assembly 146 in accordance with the well-known Lorentz relationship. As the actuator coil 144 moves, the HSA 128 pivots about the bearing assembly 130, causing the heads 138 to move over the surfaces of the discs 118 thereby allowing the heads 138 to interact with the data tracks 140 of the discs 118. When the disc drive 100 is turned off, the VCM 142 parks the HSA 128 on the ramp load snubber assembly 110 to avoid shock induced contact between the read/write heads 138 and the discs 118.

To provide the requisite electrical conduction paths between the read/write heads 138 and disc drive read/write circuitry (not shown), read/write head wires (not shown) are affixed to a read/write flex circuit 150. Next the read/write flex 150 is routed from the load arms 136 along the actuator arms 134 and into a flex circuit containment channel 152 and on to a flex connector body 154. The flex connector body 154 supports the flex circuit 150 during passage of the read/write flex circuit 150 through the basedeck 102 and into-electrical communication a disc drive printed circuit board assembly (PCBA) (not shown) mounted to the underside of the basedeck 102. The flex circuit containment channel 152 also supports read/write signal circuitry 156 used to condition read/write signals passed between the read/write circuitry (not shown) and the read/write heads 138. The disc drive PCBA provides the disc drive read/write circuitry, which controls the operation of the heads 138, as well as other interface and control circuitry for the disc drive 100.

To maintain the sealed internal environment for the disc drive 100, a seal gasket 158 is molded on to the top cover 106. Top cover 106 has a multitude of gasket attachment apertures 160 through, which gasket material flows during the gasket molding process. A continuum of symmetrically formed gasket material is disposed on both the top and bottom surfaces of the top cover 106 and injected through the apertures 160. During the cure process, the gasket material injected into the gasket attachment apertures 160 bonds the portion of the seal gasket adjacent the top surface of the top cover 106 to the portion of the seal gasket adjacent the bottom portion of the top cover 106, thereby sealing the gasket attachment apertures 160 and forming the seal gasket 158. A gasket material found to be useful for this application is "Fluorel" by the 3M Company, and more specifically, 3M "Fluorel", FE-5621Q.

The disc drive 100 has two primary assemblies, the PCBA (not shown) and a head disc assembly (RDA) 162 attached to the PCBA. The RDA 162 typically contains the mechanically active assemblies and components of the disc drive 100. Typically included within the HDA 162 are the HSA 128, the VCM 142 and a disc stack 164 sustained within the sealed environment created when the top cover 106 supporting the seal gasket 158 is secured to the basedeck 102 by fasteners 108. The disc stack 164 is formed by stacking discs 118, interleaved with spacer rings (not shown), on the spindle hub 120 of the spindle motor 114 and securing the stack with the clampring 122 and fasteners 124.

During operation of the disc drive 100, spinning discs 118 generate airflow consistent with the direction of rotation of the spinning discs 118. To reduce chances of a catastrophic failure of the disc drive 100 caused by particulate contamination internal to the HDA 162, an air filter 166 is provided internal to the HDA 162 to trap airborne particulate either present following assembly or generated during operation of the disc drive 100.

Figure 2:
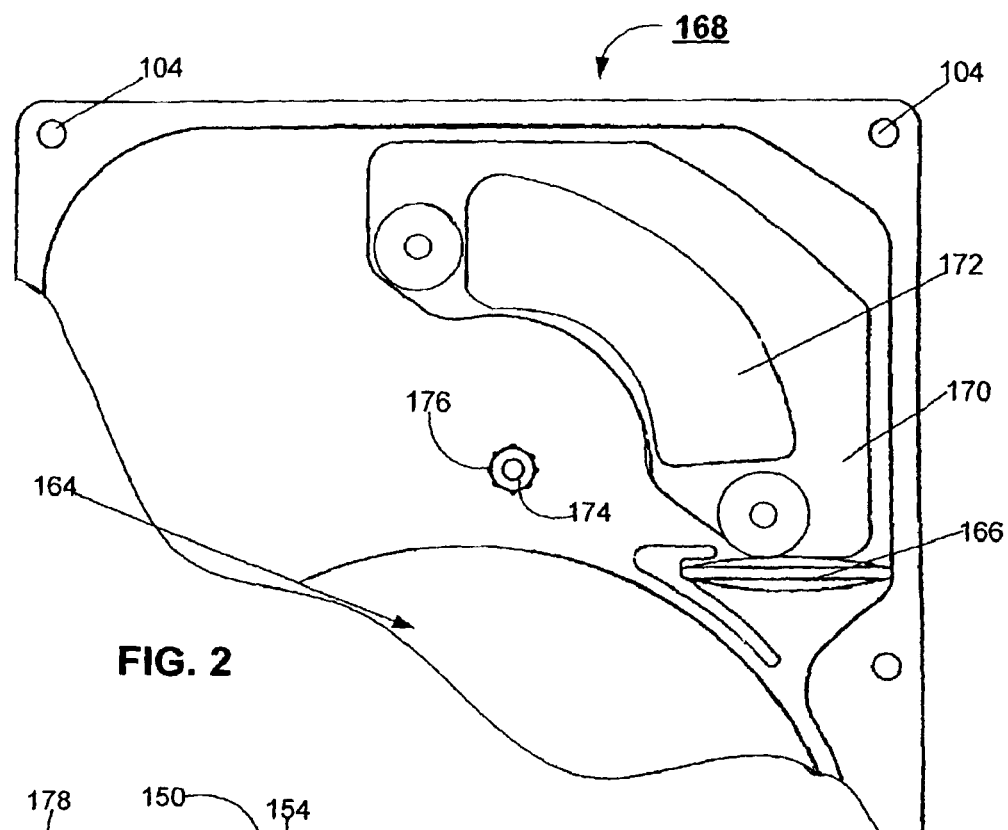
FIG. 2 is a partially cutaway top view of a basedeck assembly for the disc drive of FIG. 1.

FIG. 2 shows a basedeck assembly 168 to include the basedeck 102, the disc pack assembly 168, the air filter 166, a bottom pole piece 170 supporting a rare earth magnet 172 and a head stack assembly post 174 supporting a removably attached tolerance ring 176. The bottom pole piece 170, with the rare earth magnet 172, together with the top pole pieces 148, supporting a second rare earth magnet (not shown), form the magnet assembly 146 and the actuator coil 144 collectively form the VCM 142. The basedeck assembly 168 together with an installed HSA 128, magnet assembly 146 and top cover 106 combined to form the HDA 162 of FIG. 1.

Figure 3:
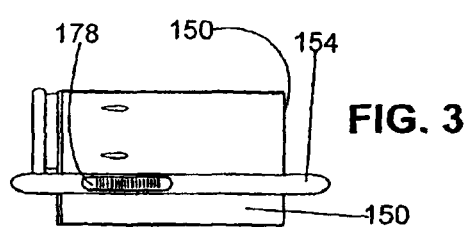
FIG. 3 is an elevational view of the flex connector body with attached flex circuit and actuator assembly serial number for the disc drive of FIG. 1.

FIG. 3 shows the flex connector body 154 with the attached flex circuit 150 supporting a machine-readable head stack assembly serial number 178. In a preferred embodiment machine-readable head stack assembly serial number 178 is a barcode but could also be characters capable of being optically recognized using optical character recognition software (OCR) or other comparable coding methodologies. The serial number 178 represents the physical characteristics for a particular HSA 128 that includes information such as the number and type of read/write heads 138 the HSA 128 contains, the type of bearing assembly 130 or the type of actuator coil 144 supported by the HSA 128.

Figure 4:
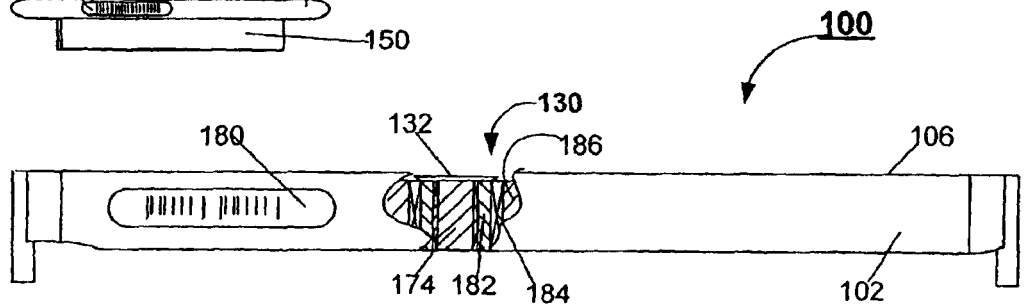
FIG. 4 is a partial cutaway elevational and partial cross-sectional view of the disc drive of FIG. 1.

FIG. 4 shows the disc drive 100 with a machine-readable head disc assembly serial number 180. Also shown by FIG. 4 is the mechanical interface between the bearing assembly 130 of the HSA 128 and the tolerance ring 176 removably attached to the head stack assembly post 174. The bearing assembly 130 includes the beveled pick and place member 132, and an inner race 182 separated by a bearing 184 from an outer race 186. During installation of the HSA 128 into the basedeck assembly 168 the inner race 182 of the bearing assembly 130 forcefully engages the tolerance ring 176 as the HSA 128 is pressed onto the tolerance ring 176 through application of a compressive load on the HSA 128.

Figure 5:
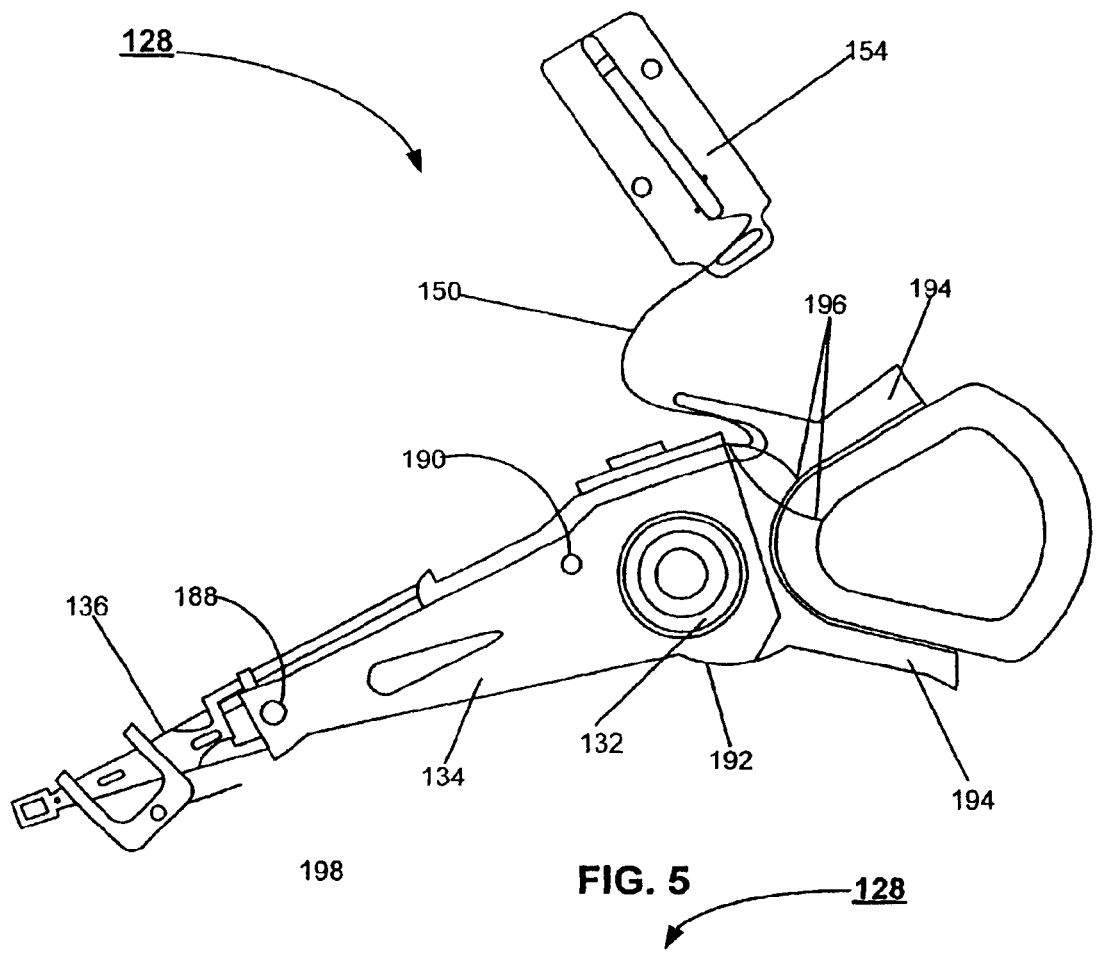
FIG. 5 is a plan view of the actuator assembly of the disc drive of FIG. 1.

FIG. 5 shows a tooling hole 188 provided in the actuator arms 134 to support the load arms 136. Typically, the load arms 136 are affixed to the actuator arms 134 through a process referred to as swaging. The swaging process normally involves alignment of the load arms 136 with the actuator arms 134 and passage of a swage tool through the tooling hole 188. A tooling hole 190 is provided to facilitate alignment and containment of an actuator body 192 during assembly of the HSA 128, including the swaging process.

Actuator coil support arms 194 support the actuator coil 144 of the HSA 128 and serve as reference surfaces, along with tooling hole 190, for alignment of the HSA 128 in preparation for installation of the HSA 128 into head disc assembly 162. Additionally, FIG. 5 shows actuator coil leads 196 electrically communicating with the read/write flex circuit 150, the actuator coil leads 196 conduct current from the read/write flex circuit 150 to the actuator coil 144, facilitating operation of the VCM 142.

To initiate the process of installing the HSA 128 onto the tolerance ring 176, an operator completes a series of inspection and preparation steps. The operator first checks the flex connections (not separately shown) and the bearing assembly 130 to assure the HSA 128 is intact. Next the operator manually removes a shipping constraint (not shown), used to protect the HSA 128 during shipment, and adjusts the head stack assembly installation comb 198 to complete the preparation and inspection steps.

Figure 6:
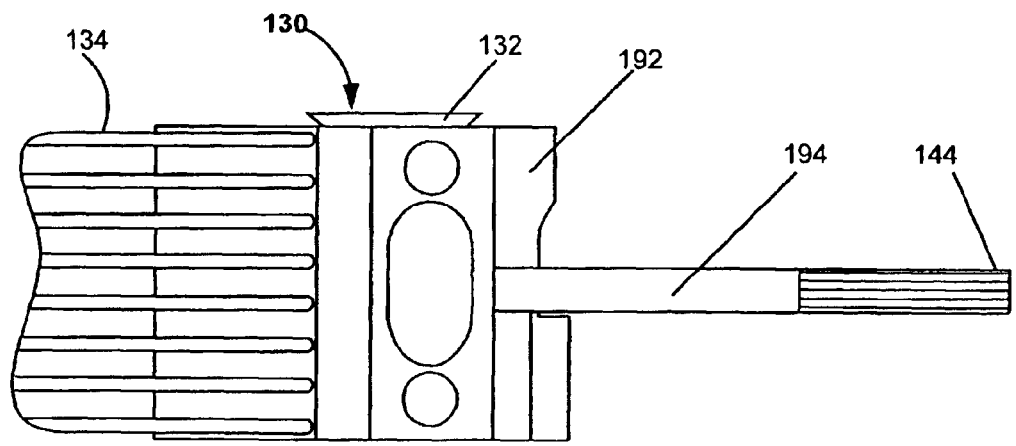
FIG. 6 is a partial cutaway elevational view of the actuator assembly of the disc drive of FIG. 1.

FIG. 6 shows the relationship between the various members and components of the HSA 128. The majority of mass of the HSA 128 is concentrated around the axis of rotation of the bearing assembly 130 and is made up by the actuator body 192 and the bearing assembly 130. The actuator body 192 supports the actuator coil support arms 194, the actuator arms 134 and bearing assembly 130. The beveled pick and place member 132 is supported by the bearing assembly 130 and protrudes about the top plain of the actuator body 192. The beveled pick and place member 132 provides a grip for handling the HSA 128 during installation of the HSA 128 into the basedeck assembly 168 of the HDA 162 of the disc drive 100.

Figure 7:
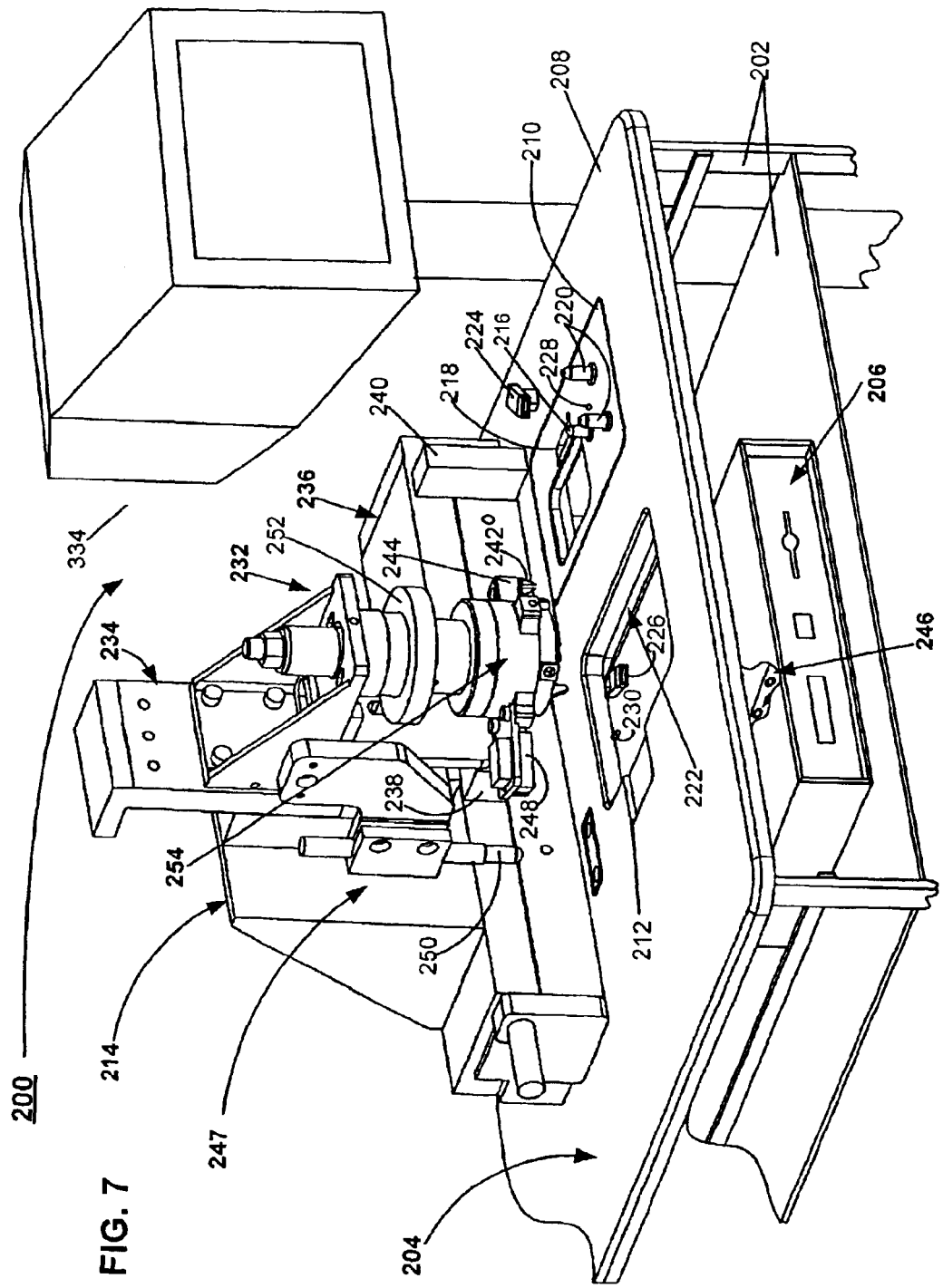
FIG. 7 is a partial cutaway perspective view of the head stack assembly installation system of the present invention.

FIG. 7 shows a head stack assembly installation system 200 with a frame 202 supporting a head stack assembly installation tool 204 and a computer 206. For a preferred embodiment, the computer 206 is shown adjacent the head stack assembly installation tool 204 and supported by the frame 202. However, the head stack assembly installation tool 204 and the computer 206 need not be proximately located, one to the other. Electronic communication between the head stack assembly installation tool 204 and the computer 206 is sufficient to operate the head stack assembly installation tool 204 during installation of the HSA 128 into the HDA 162.

The computer 206 is a host for an installation software program (not shown) that has installation software program steps. The computer 206 is used to calculate position and force data from position and force parameter measurements gathered by the head stack assembly installation tool 204 during the process of installing the actuator assembly 128 into the basedeck assembly 168 of the HDA 162. The installation software program directs and controls process steps executed by the head stack assembly installation tool 204, based-on the position and force data calculated by the computer 206 from the position and force parameter measurements gathered by the head stack assembly installation tool 204.

The head stack installation tool 204 has a main plate 208 that provides a nesting position 210, an installation position 212 and a robotic assembly 214. The nesting position 210 provides a tooling pin 216 that communicates with the tooling hole 190 of the HSA 128; a connector nest 218, which cradles and aligns the flex connector body 154 of the HSA 128 with the actuator body 192 for installation of the HSA 128 into the HDA 162; and head stack assembly alignment pins 220 that interface with the actuator coil support arms 194 to maintain the HSA 128 in a predetermined position prior to installation of the HSA 128 into the basedeck assembly 168. The installation position 212 aligns the basedeck assembly 168 of the HDA 162 for installation of the HSA 128 into the basedeck assembly 168. Adjacent the installation position 212 is a lift and locate assembly 222 that lifts the basedeck assembly 168 from a conveyor (not shown) and locates the basedeck assembly 168 within the installation position 212. Additionally, the main plate 208 supports a head stack assembly scanner head 224 adjacent the nesting position 210 to read the machine readable head stack assembly serial number 178; a head disc assembly scanner head 226 adjacent the installation position 212 to read the machine readable head disc assembly serial number 180; a head stack assembly present sensor 228 adjacent the head stack assembly alignment pins 220 to detect the presence of HSA 128 in the nesting position 210; and a head disc assembly present sensor 230 adjacent the installation position 212 to detect the presence of the basedeck assembly 168 within the installation position 212.

The robotic assembly 214 has an end effector assembly 232 supported by a vertical slide assembly 234, which in turn is supported by a horizontal slide assembly 236 that is directly supported by the main plate 208. The position of the vertical slide assembly 234 during the operation of the head stack assembly installation system 200 is reported to the computer 206 by a vertical slide digital sensor 238 located adjacent the vertical slide 234. The position of the horizontal slide assembly 236, during the operation of the head stack assembly installation system 200, is reported to the computer 206 by a horizontal slide digital sensor 240 positioned adjacent the horizontal slide 236. The end effector assembly 232 uses the beveled pick and place member 132 of the HSA 128 to grip the HSA 128 for installation onto the tolerance ring 176. The end effector assembly 232 also has a pair of opposing positionable flex connector grippers 242 configured to communicate with the flex connector body 154. A pair of opposing positionable flex connector grippers 242 maintain alignment of the flex connector body 154 in relation to the actuator body 192 while the robotic assembly 214 is pressing the HSA 128 onto the tolerance ring 176 during the process of installing the HSA 128 into the basedeck assembly 168 of the HDA 162. A pneumatic cylinder housing 244 supports the pair of opposing positionable flex connector grippers 242 as well as supporting a pneumatic cylinder (not shown) used to operate the pair of opposing positionable flex connector grippers 242.

As shown in FIG. 7, a communication interface-electronics assembly 246 is mounted internal to the computer to 206. However, like the computer 206 itself, the communication interface electronics assembly 246 need not be proximately located to the computer 206, but rather, electronic communication between the communication interface electronics assembly 246 and the computer 206 is sufficient to operate the head stack assembly installation tool 204 during installation of the HSA 128 into the HDA 162. The communication interface electronics assembly 246 cooperates with a measurement assembly 247 that includes a radial displacement potentiometer 248, a linear variable differential transformer 250 (LVDT), and a load cell 252. The radial displacement potentiometer 248 is supported by the end effector assembly 232 and electronically communicates with the communication interface electronics assembly 246 during the process of installing the HSA 128 into the basedeck assembly 168. The radial displacement potentiometer 248 measures position parameters of the gripping action of the end effector assembly 232 during installation process, and reports the measurements to the computer 206 through the communications interface electronics assembly 246. The LVDT 250 is supported by the vertical slide assembly 234 and electronically communicates with the communication interface electronics assembly 246 during the installation process. The LVDT 250 measures parameters of vertical distance traveled by the vertical slide 234 relative to the head stack assembly post 174 and reports the measured parameters to the computer 206. The load cell 252 is supported by the end effector assembly 232 and electronically communicates with the communication interface electronics assembly 246 during the HSA 128 to HDA 162 installation process. The load cell 252 measures parameters of mechanical resistance between the tolerance ring 176 and HSA 128, while the HSA 128 is being pressed onto the tolerance ring 176 to install the HSA 128 into the HDA 162.

Figure 8:
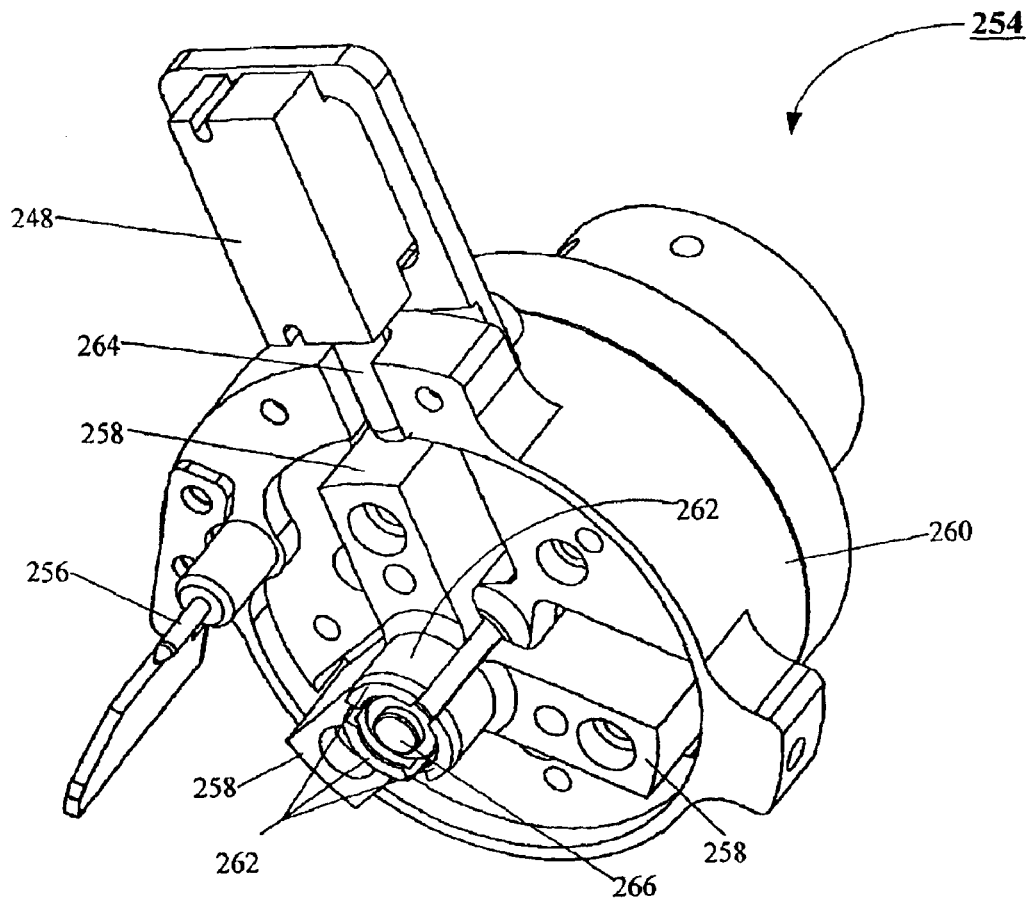
FIG. 8 is a perspective view of an end effector assembly of the head stack assembly installation system of FIG. 7.

FIG. 8 shows a gripper 254 of the end effector 232. Included in the gripper 254 is a radially disposed positionable gripper section 258 linked to operate in unison and attached to a gripper housing 260. Each gripper section 258 supports a gripper finger 262 that is shaped to conform to the slope of the external surface of the beveled pick and place member 132. Each of the radially disposed positionable gripper sections 258 is coupled to the potentiometer 248 by a potentiometer coupling arm 264.

A push pad (also referred to as a "centering post") 266 is attached to the gripper housing 260 and circumvented by the radially disposed positionable gripper sections 258. The radially disposed positionable gripper sections 258 move toward the push pad 266 contacting beveled pick and place member 132 to align the HSA 128 to the end effector assembly 232. Alignment of the HSA 128 to the end effector assembly 232 includes alignment of the top inner race 182 to the push pad 266. During the installation process the gripper lingers 262 remain in contact with the beveled pick and place member 132 until contact is established between the HSA 128 and the head stack assembly post 174. Upon measurement of initial contact between the HSA 128 and the HDA 162, and reporting of that measured contact to the computer 206 by the load cell 252, the radially disposed positionable gripper sections 258 disengage contact with the beveled pick and place member 132. The push pad 266 remains in contact with the inner race of the bearing assembly 130 to transfer the compressive load delivered by the end effector assembly 232 to the HSA 128 during the process of pressing the HSA 128 onto the tolerance ring 176 of the HDA 162. Retracting the radially disposed positionable gripper sections 258 from contact with the beveled pick and place member 132 during the process of pressing the HSA 128 into position reduces the chances of the bearing 184 being damaged during installation process.

Figure 9:
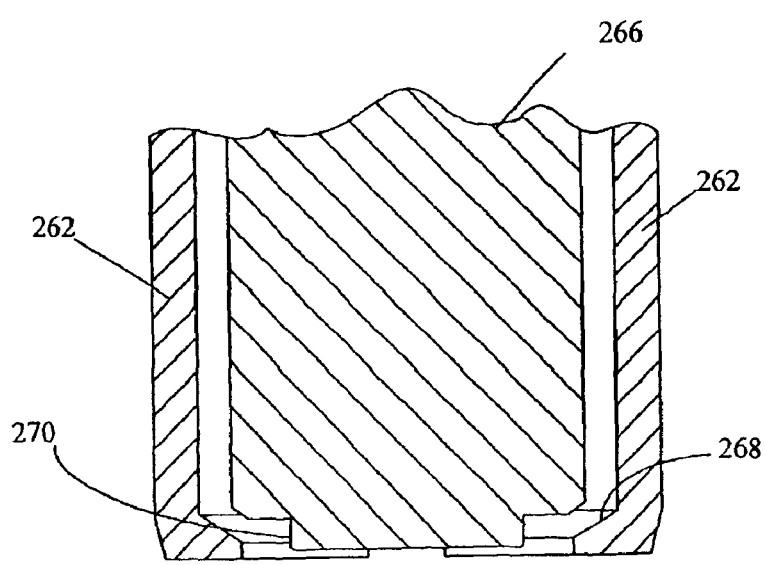
FIG. 9 is a cross-sectional, partial cutaway view of radially disposed positionable gripper sections of the end effector of FIG. 8.

FIG. 9 shows the interaction between the gripper fingers 262, the push pad 266 and the beveled pick and place member 132. The gripper fingers 262 provide a slope surface 268 that conforms to the slope of the outer surface of the beveled pick and place member 132 while the push pad 266 provides a shouldered outer diameter 270 that is inserted into the inner race of the pick and place member 132. When activated to engage the HSA 128, the radially disposed positionable gripper sections 258 contact the outer surface of the bevel pick and place member 132 and align the HSA 128 to the end effector assembly 232 by positioning the inner surface of the pick and place member 132 into contact with the outer diameter 270 of the push pad 266.

Figure 10:
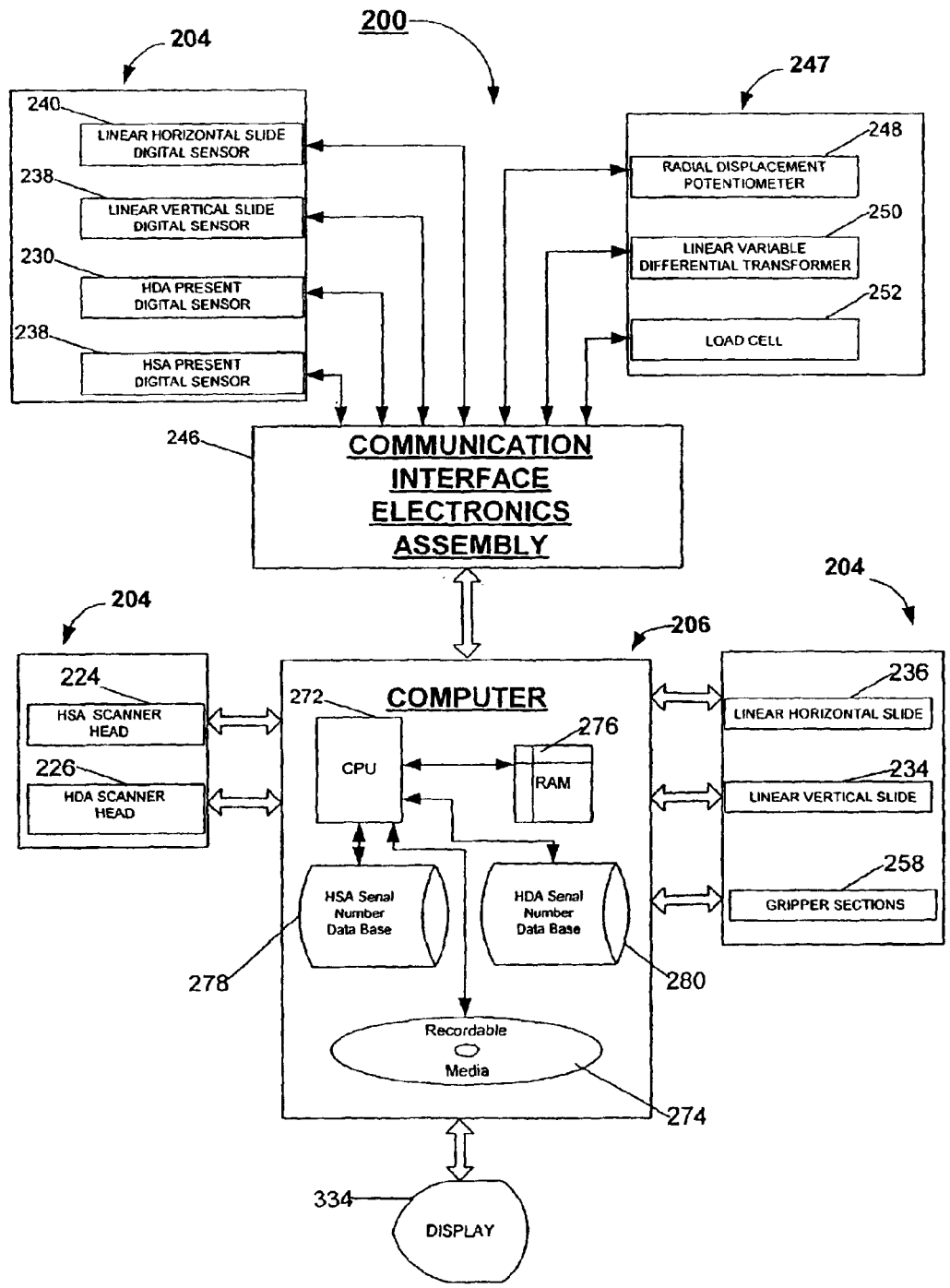
FIG. 10 is a flow chart of system hardware communication for the head stack assembly installation system of FIG. 7.

FIG. 10 shows a central processing unit 272 (CPU) electronically communicating with recordable media 274. The recordable media 274 holds an installation software program (not separately shown) that has installation software program steps to carry out the assembly herein described. The term electronically communicating or in electronic communication does not necessarily mean that the two devices engaging in the communication are physically connected. The term includes devices that are physically connected and devices that are electronically connected via networking links such as infrared communication, radio-frequency communication or through the internet via satellite communication. For example, the recordable media 274 may be located in one country, for example the United States, and the CPU 272 could be located in a different country, for example Ireland. The two devices, the CPU 272 and the recordable media 274, are each elements of the head stack assembly installation system 200, dependent on each other for the functioning of the head stack assembly installation system 200, but neither is in direct physical contact with the other. They are however, linked, one to the other, electronically as portions of the head stack assembly installation station 200. FIG. 10 also shows the CPU 272 in electronic communication with a volatile memory 276 (also referred to herewith in as random access memory or RAM), a head stack assembly serial number data base 278 and a head disc assembly serial number data base 280.

The CPU 272 electronically communicates with the recordable media 274 to upload the installation software program into the RAM 276 prior to execution of the installation process. During the installation process the installation software operates out of the RAM 276. In addition to containing an active version of the installation software program the RAM 276 also temporarily stores information communicated to the computer 206 from the communication interface electronics assembly 246. The stored information includes a head stack assembly present signal (not shown), detected by the head stack digital sensor 228, a head disc present signal (not shown), detected by the head disc assembly present digital sensor 230, a value (not shown) representing the head stack assembly serial number 178, provided by the head stack assembly scanner head 224 and a value (not shown) presenting the head disc assembly serial number 180, provided by the head disc assembly scanner head 226. During operation of the head stack assembly installation system 200 additional data regarding position and force parameters encountered by the HSA 128 during the installation process as well as position data for the radially disposed positionable gripper sections 258, the vertical slide assembly 234 and the horizontal slide assembly 236 are gathered and written to the RAM 276 on a real-time basis. The position of the horizontal slide assembly 236 is monitored and reported to the communication interface electronics 246 by the linear horizontal slide digital sensor 240, the position of the vertical slide assembly 234 is monitored and reported to the communication interface electronics 246 by the linear vertical slide digital sensor 238, while position data for the gripper sections 258 is continually monitored by the radial displacement potentiometer 248. The position and force parameter measurements encountered by the HSA 128 while being pressed onto the tolerance ring 176 are made and supplied to the RAM 267 by the linear variable differential transformer 250 and the load cell 252 respectively.

Two additional elements of the head stack installation system 200 are shown by FIG. 10. In electronic communication with the CPU 272 are the HSA serial number data base 278 and the HDA serial number data base 280, the HSA serial number data base 278 containing the physical characteristics of each HSA 128 available for installation into each HDA 164, while the HDA serial number data base 280 contains the physical characteristics of each HDA 164 available for receipt of the HSA 128. Prior to joining each available HSA 128 with each available HDA 164, the installation software program instructs the CPU 272 to read the serial number 178 of the HSA 128 from RAM 276, query the HSA serial number data base 278 and retrieve the physical characteristics information contained within the HSA serial number data base 278 for the HSA 128 serial number read from the RAM 276. The installation software program then instructs the CPU 272 to read the serial number 180 from RAM 276, query the HDA serial number data base 280 and retrieve the physical characteristics information contained within the HDA serial number data base 280 for the HDA 164 serial number read from the RAM 276. The software installation program then instructs the CPU 272 to compare the physical characteristics of the HDA 164 and the HSA 128 to one another, to ensure compatibility prior to proceeding with the installation of the HSA 128 into the HDA 164.

Figure 11:
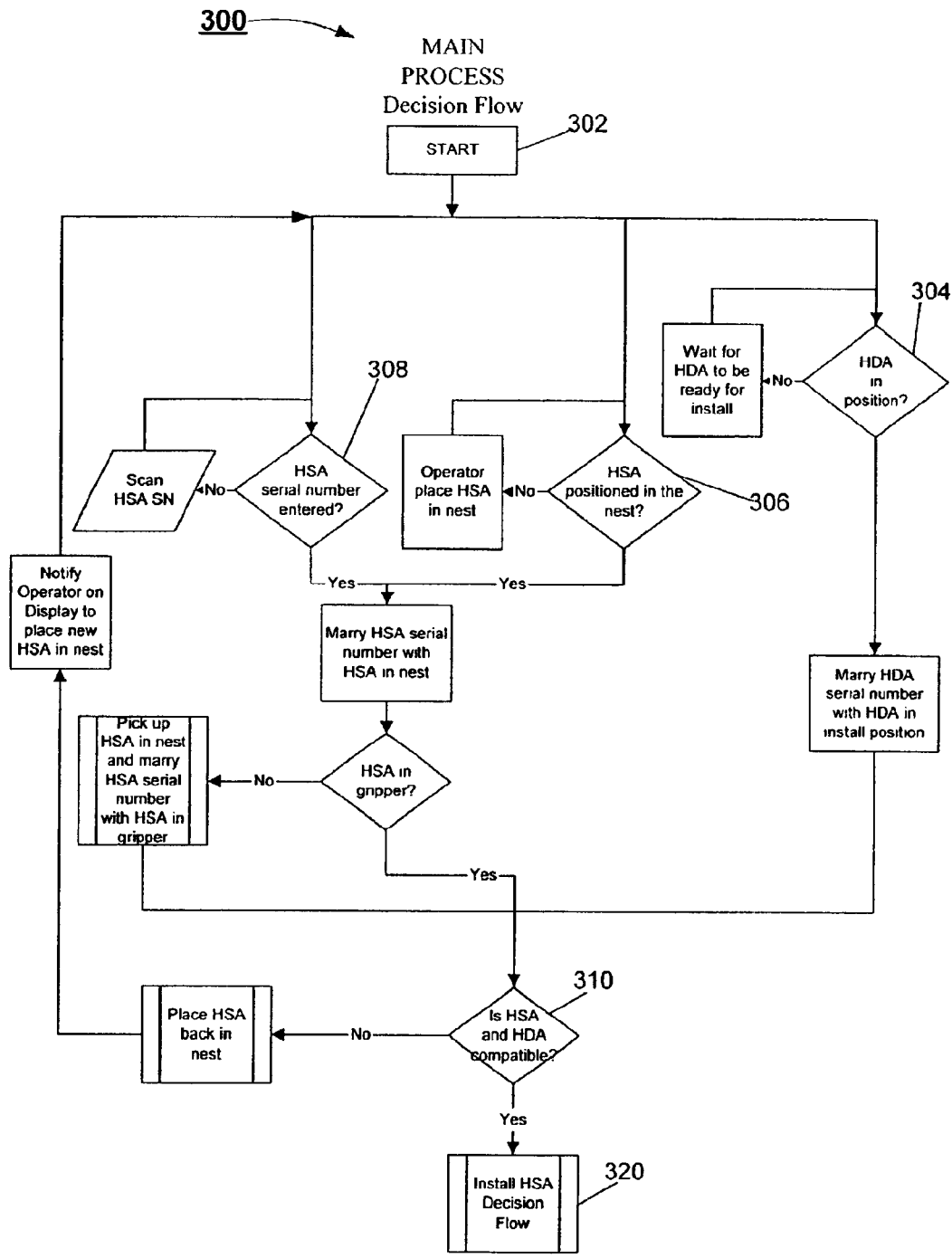
FIG. 11 is a flow chart for logic of main process steps of an installation software program of the head stack assembly installation system of FIG. 7.

FIG. 11 shows a main process decision flow 300 utilized by the installation software program to grip the HSA 128 in preparation for installation of the HSA 128 into the HDA 164 of the disc drive 100. Once a start step 302 of the installation software program steps is initialized, three decision steps follow. The first decision step, HDA in position 304, verifies the presence of the HDA 164 within the installation position 212 of the main plate 208. The second decision step, HSA positioned in the nest 306, verifies the presence of HSA 128 in the nesting position 212 of the main plate 208 and the third decision step, HSA serial number entered 308, verifies the presence of the serial number 178 within the RAM 276.

The main process decision flow 300 shows the installation software program instructs the robotic assembly 214 to grip the HSA 128 and proceed to predefined process steps install HSA decision flow 320 (of FIG. 12), provided responses of the three decision steps are affirmative along with an affirmative response from a decision step HSA and HDA compatible 310. In addition to the specifically identified decision steps, the main process decision flow 300 shows the decision loops entered into by the installation software program if a non affirmative response is encountered from one of the specifically identified decision steps. The software installation program remains in the decision loop until the installation software program, from that decision loop, receives an affirmative response.

Figure 12:
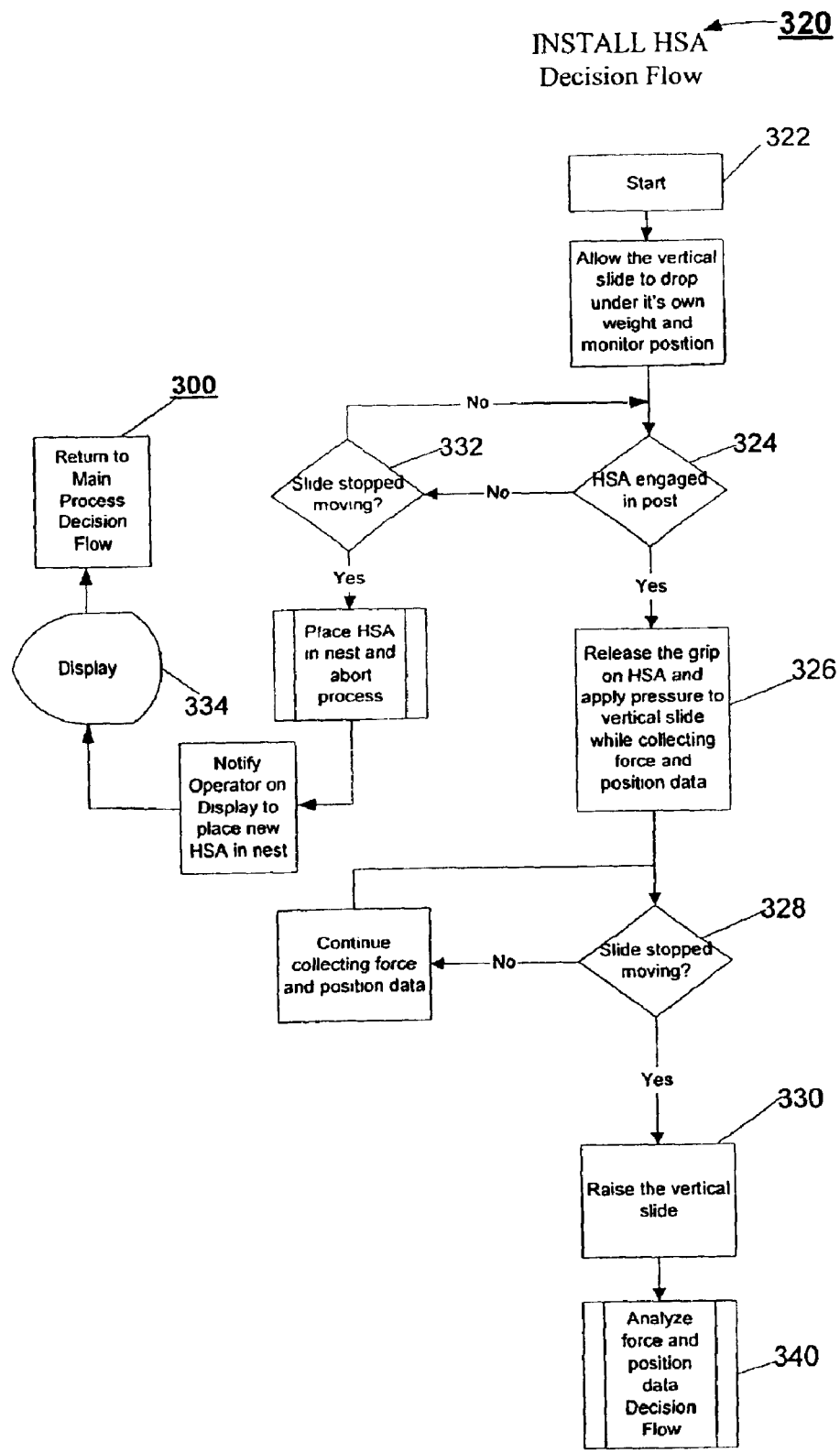
FIG. 12 is a flow chart for logic of head stack assembly installation process steps of the installation software program of the head stack assembly installation system of FIG. 7.

FIG. 12 shows the install HSA decision flow 320 of the installation software program utilized by the installation software program to engage the tolerance ring 176 with the HSA 128. A start step 322 is the first installation software program step of the install HSA decision flow 320. There are two primary decision steps involved in the install HSA decision flow 320. The first, a HSA engaged post 324, initiates step 326 upon successful engagement of the head stack assembly post 174 with the HSA 128. Installation software program step 326 directs the actions of releasing the radially disposed positionable gripper sections 258 from contact with the beveled pick and place member 132, applying a compressive load on the HSA 128 with the robotic assembly 214, and collecting force and distance parameters from the load cell 252 and the LVDT 250 respectively. Upon successful completion of the second decision step, slide stopped moving 328, the installation software program initiates step 330, an action of raising the vertical slide 234 to discontinue application of the compressive load on the HSA 128 and to proceed to an analyze force and position data-decision flow 340 (of FIG. 13), another predefined sequence of process steps of the installation software program.

The install HSA decision flow 320 shows the decision loops entered into by the installation software program should a non affirmative response be a result of one of the decision steps. The software installation program remains in a decision loop until the installation software program receives, from either of the decision steps 324 or 328, an affirmative response. However, should the software installation program receive an affirmative response from a slide not moving 332 decision step, the installation software program directs the robotic assembly 214 to return the HSA 128 to the nest position 210 and displays a message on a display 334 for the operator to resolve the conflict and restart the process at main decision now 300.

Figure 13:
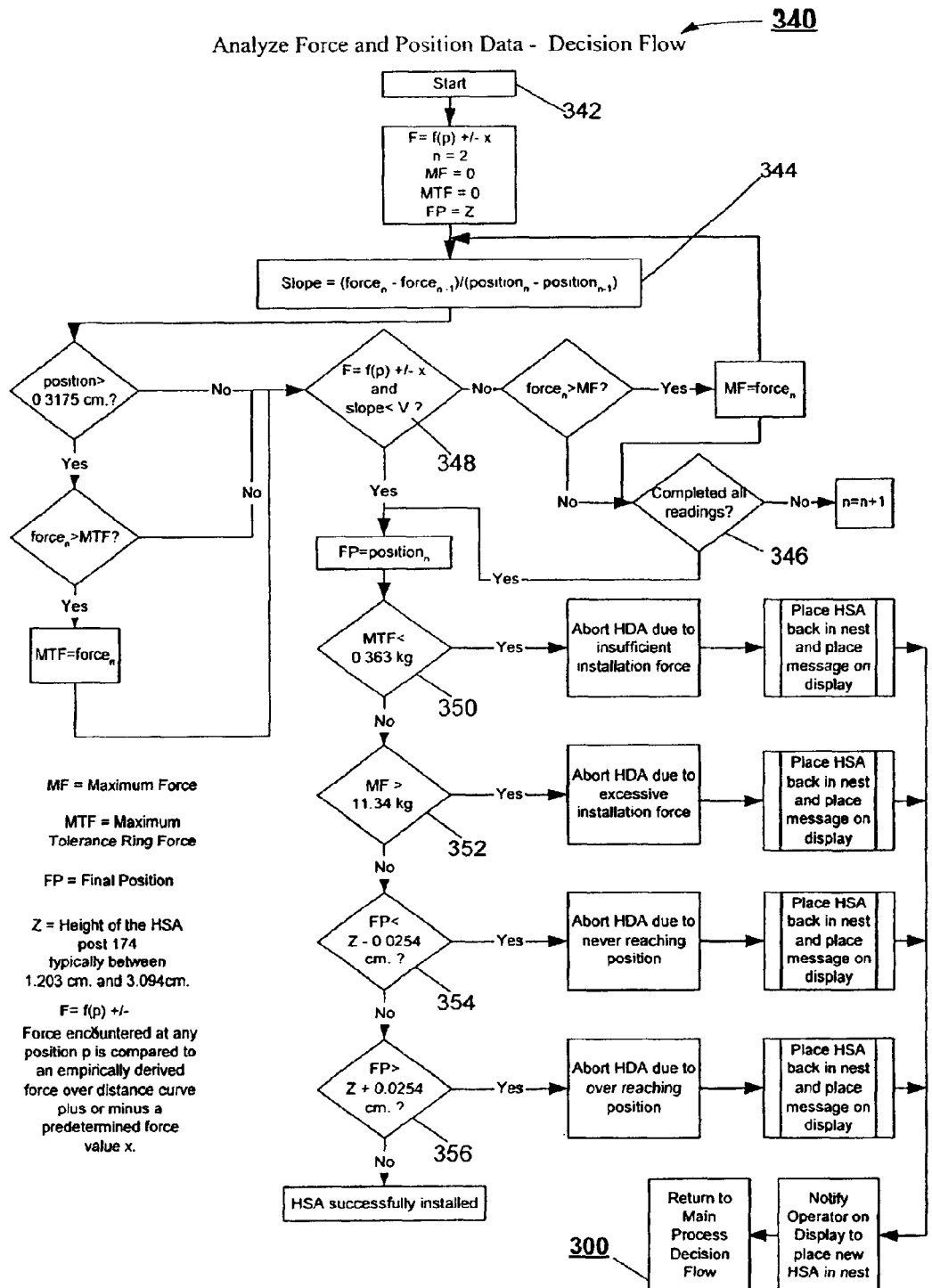
FIG. 13 is a flow chart for logic of head stack assembly installation analysis process steps of the installation software program of the head stack assembly installation system of FIG. 7.

FIG. 13 shows the analyze force and position data-decision flow 340 of the installation software program utilized by the installation software program to measure and analyze forces and positions encountered by the HSA 128 while engaging the tolerance ring 176, as the robotic assembly presses the HSA 128 into the basedeck assembly 168. A start step 342 is the first installation software program step of the analyze force and position data-decision flow 340. The software installation program incorporates a force to distance ratio equation 344 to monitor installation of the HSA 128 onto (the tolerance ring. During the installation process, process parameter measurements representing force and distance are gathered by the head stack installation tool 204 (of FIG. 7) and electronically communicated to the computer 206 (of FIG. 7). The computer 206 manipulates the measurements by converting the measurements into values and substituting those values into equation 344. The resulting calculated value, a slope, is compared to predetermined value dynamic slope V of decision step 348.

Figure 14:
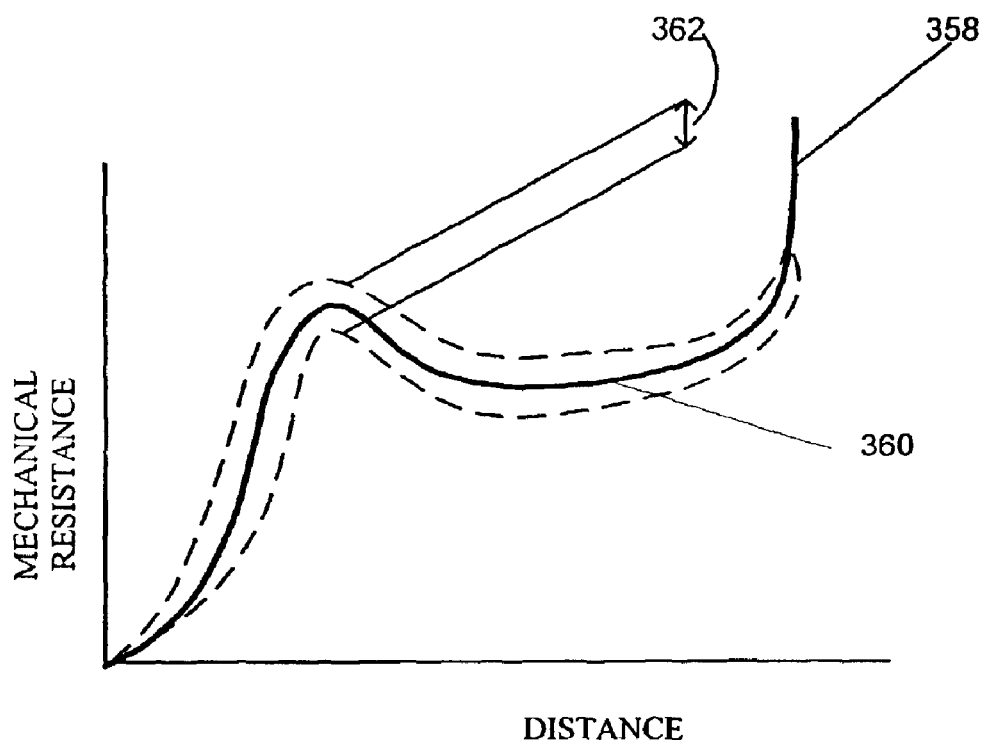
FIG. 14 is a diagram showing a family of empirically derived mechanical resistance thresholds.

Turning to FIG. 14, the predetermined value V is empirically derived for forces typically encountered by the HSA 128 while being pressed onto the tolerance ring 176 at specific increments of distance encountered by the HSA 128 while traveling along the tolerance ring 176 and found to have a maximum value of 600, 358. The software also monitors mechanical resistance encountered during the process at time intervals of about every 50 milliseconds over the distance traveled by the HSA 128 while traveled along the tolerance ring 176. Empirically gathered mechanical resistance data yielded a mechanical resistance as a function of position (f(p)) curve 360. The mechanical resistance as a function of position curve 360 was arrived at through normal curve fitting techniques, relating the mechanical resistance encountered by the HSA 128 while being pressed onto the tolerance ring 176 to a point representing the distance covered by the head stack assembly at the point in time the mechanical resistance was encountered. A tolerance of about plus and minus 5% of the mechanical resistance encountered by the HSA 128 in any region of the tolerance ring 176 was elected and applied to the force curve resulting in a family of values representing dynamic force thresholds 362 against which actual measured process data can be dynamically compared. Forces encountered that fall outside the dynamic, either insufficient or excessive, trigger the head stack assembly installation station to abort the process.

Returning to FIG. 13, the equation (F=f(p)+/−x) and slope<V of 348 is interpreted to mean as follows: should the force (F) measured as encountered by the HSA 128 at a position (p) while being pressed onto the tolerance ring 176 fall outside the empirically derived force as a function of position (f(p)) curve, plus or minus (x), about 5% of the force empirically found to be encountered at position (p) along the tolerance ring 176 during the mating process, the process will be aborted. And, should the force (F) measured as encountered by the HSA 128 at a position (p) while being pressed onto the tolerance ring 176 fall within the empirically derived mechanical resistance as a function of position (f(p)) curve 360 (of FIG. 14), plus or minus (x), about 5% of the mechanical resistance empirically found to be encountered at position (p) along the tolerance ring 176 during the mating process, but the slope exceeds a predetermined value, empirically found to be about 600 the process will be aborted. Or, if the resultant calculated value falls outside the predetermined value V, the installation software program instructs the head stack installation tool 204 to abort the process, return the HSA 128 to the nest position 210 (of FIG. 7), and display a message on the display 334 reporting the status of the process and instructing the operator to remove the HSA 128 from the nest position 112, place the next HSA 128 into the nest position 112 and restart the process at process step 300. However, typically the software installation program remains in decision loops until the installation software program receives, from either of the installation software program steps 346 or 348, an affirmative response.

Upon receipt of an affirmative response from either installation software program steps 346 or 348, the installation software program proceeds to evaluate a course of action to be followed by the head stack installation tool 204, based on decision steps represented by installation software program steps 350, 352, 354 and 356. In each of the four installation software program steps 350, 352, 354 and 356 the installation software program checks process end points for specific values of force or distance encountered by the HSA 128 during the installation process. If the process end point values for the amount of force encountered by the HSA 128 is less than 11.34 kilograms, but greater than 0.363 kilograms, and the distance traveled by the HSA 128 after encountering the head stack assembly post 174 (of FIG. 4) is greater than Z minus 0.0254 centimeters, but less than Z plus 0.0254 centimeters (where Z is typically between 1.203 centimeters and 3.094 centimeters), the head stack installation tool 204 has successfully installed the HSA 128 into the HDA 162 (of FIG. 1). If the process end point values for the amount of force encountered by the HSA 128 or the distance traveled by the HSA 128 after encountering the head stack assembly post 174 falls outside those parameters, the installation software program instructs the head stack installation tool 204 to abort the installation process attempt, directs the robotic assembly 214 to return the HSA 128 to the nest position 210 and displays a message on a display 334 for the operator to resolve the conflict and restart the process at main decision flow 300.

The present invention provides a head stack assembly installation system (such as 200) with a head stack installation tool (such as 204) electronically communicating with a computer (such as 206) that has an active installation software program directing and controlling process steps enacted by head stack installation tool to install a head stack assembly (such as 128) into a head disc assembly of a disc drive (such as 100). The head stack installation tool provides a nesting position (such as 210) for aligning in staging head stack assembly prior to installation into the head disc assembly, an installation position (such as 212) for locating in securing the head disc assembly while awaiting installation of the head stack assembly, a robotic assembly (such as 214) the robotic assembly includes an end effector assembly (such as 232) supported by a vertical slide assembly (such as 234), which is in turn supported by a horizontal slide assembly (such as 236) that attaches to a main plate (such as 208). A measurement assembly made up of a communications interface electronics assembly (such as 246) electronically communicating with a radial displacement potentiometer (such as 248), a linear variable differential transformer (such as 250), and a load cell (such as 252). The robotic assembly picks and places the head stack assembly into the head disc and the measurement assembly collects and communicates process position and force parameters to the computer for use by the computer in calculating distance and force data. The active installation software program directs and controls enactment of process steps followed by the head stack installation tool by directing the computer to execute installation software program steps based on the position and force data calculated by the computer.

It is clear that the present invention is well adapted to attain the ends and advantages mentioned as well as those inherent therein. While a presently preferred embodiment of the invention has been described for purposes of the disclosure, it will be understood that numerous changes can be made which will readily suggest themselves to those skilled in the art. Such changes are encompassed within the spirit of the invention disclosed and as defined in the appended claims.

What is claimed is:

1. A head stack assembly installation system comprising:
   a frame;
   a head stack installation tool supported by the frame, comprising:
      a robotic assembly for picking and pressing a head stack assembly within a head disc assembly; and
      a measurement assembly for measuring process position and force parameters encountered by the head stack assembly during installation of the head stack assembly within the head disc assembly; and
   a computer electronically communicating with the head stack installation tool for directing and controlling the robotic assembly during installation of the head stack assembly based on position and force parameter measurements from the measurement assembly.

2. The head stack assembly installation system of claim 1, in which the head stack installation tool comprises:

a main plate having a nesting position and an installation position, the main plate supporting the robotic assembly, the nesting position for aligning the head stack assembly, the installation position for aligning the head disc assembly;

a head stack assembly scanner for identifying the head stack assembly and communicating the identification to the computer;

a head disc assembly scanner for identifying the head disc assembly and communicating the identification to the computer;

a plurality of head stack assembly alignment pins for aligning an actuator body and a voice coil assembly of the head stack assembly; and a connector nest for aligning a flex connector body relative to the voice coil assembly of the head stack assembly.

3. The head stack assembly installation system of claim 2 wherein the robotic assembly comprises:

a horizontal slide assembly attached to the main plate;

a vertical slide assembly supported and selectively positioned horizontally by the horizontal slide assembly;

an end effector assembly supported and selectively positioned vertically by the vertical slide assembly;

a horizontal slide sensor detecting and communicating end effector assembly horizontal position to the computer; and a vertical slide sensor detecting and communicating end effector assembly vertical position to the computer.

4. The head stack assembly installation system of claim 3, in which the end effector assembly comprises:

radially disposed positionable gripper sections configured for communication with a beveled pick and place member of the head stack assembly; and a pair of opposing positionable flex connector grippers configured for communication with the flex connector body of the head stack assembly.

5. The head stack assembly installation system of claim 4, in which the measurement assembly comprises:

a potentiometer supported by the end effector assembly for reporting radial displacement measurements of the radially disposed positionable gripper sections relative to the beveled pick and place member to the computer;

a linear variable differential transformer supported by the vertical slide assembly for reporting vertical distance measurements traveled by the head stack assembly relative to the tolerance ring to the computer; and a load cell supported by the end effector assembly for reporting mechanical resistance between the head stack assembly and the tolerance ring to the computer.

6. The head stack assembly installation system of claim 5 wherein the computer comprises:

a central processing unit communicating with a installation software program;

a volatile memory in communication with the central processing unit for temporarily storing the installation software program, the identity of the head stack assembly provided by the head stack assembly scanner, the identity of head disc assembly provided by the head disc assembly, and measurements from the load cell, the linear variable differential transformer, the potentiometer, the vertical slide sensor and the horizontal slide sensor;

a head stack assembly data base in communication with the central processing unit and storing physical characteristics of all head stack assemblies available for installation; and a head disc assembly data base in communication with the central processing unit and storing physical characteristics of all head disc assemblies available to receive head stack assemblies.

7. The head stack assembly installation system of claim 6 wherein the head stack installation station further comprises a communication interface electronics assembly communicating with the computer providing communication interface between the computer and the head stack installation tool, the measurement assembly and the robotic assembly.

* * * * *